United States Patent [19]
Pratt et al.

[11] Patent Number: 5,259,445
[45] Date of Patent: Nov. 9, 1993

[54] CONTROL FOR DUAL HEATING SYSTEM INCLUDING A HEAT PUMP AND FURNACE

[75] Inventors: Robert G. Pratt, Farmington Hills; Lawrence A. Kasik, Livonia; William S. Gianino, Lake Orion, all of Mich.

[73] Assignee: The Detroit Edison Company, Detroit, Mich.

[21] Appl. No.: 912,506

[22] Filed: Jul. 13, 1992

[51] Int. Cl.[5] .................. F25B 29/00; F25B 13/00
[52] U.S. Cl. ........................... 165/12; 165/29; 236/46 R
[58] Field of Search .............. 165/12, 29; 236/46 R

[56] References Cited

U.S. PATENT DOCUMENTS

| | | | |
|---|---|---|---|
| 4,102,390 | 7/1978 | Harnish et al. | 165/29 |
| 4,143,707 | 3/1979 | Lewis et al. | 165/29 |
| 4,147,203 | 4/1979 | Rayfield | 165/29 |
| 4,158,383 | 6/1979 | Rayfield | 165/29 |
| 4,265,298 | 5/1981 | Sumner, Jr. et al. | 165/29 |
| 4,266,599 | 5/1981 | Saunders et al. | 165/29 |
| 4,269,261 | 5/1981 | Kountz et al. | 165/29 |
| 4,442,972 | 4/1984 | Sahay et al. | 165/12 |
| 4,593,176 | 6/1986 | Seefeldt | 165/29 |
| 4,627,483 | 12/1986 | Harshbarger, III et al. | 165/29 |
| 4,627,484 | 12/1986 | Harshbayer, Jr. et al. | 165/29 |
| 4,702,413 | 10/1987 | Beckey et al. | 165/29 |
| 4,828,016 | 5/1989 | Brown et al. | 165/12 |
| 4,941,325 | 7/1990 | Nuding | 62/158 |
| 4,971,136 | 11/1990 | Malhm et al. | 165/29 |

FOREIGN PATENT DOCUMENTS

| | | | |
|---|---|---|---|
| 0007497 | 2/1980 | European Pat. Off. | 165/29 |
| 3302024 | 7/1984 | Fed. Rep. of Germany | 165/29 |
| 0163548 | 6/1989 | Japan | 165/29 |

Primary Examiner—John K. Ford
Attorney, Agent, or Firm—Barnes, Kisselle, Raisch, Choate, Whittemore & Eulbert

[57] ABSTRACT

A programmable thermostat is provided for the selective operation either of a fossil fuel furnace or a heat pump. The thermostat is programmed to operate the fossil fuel furnace when the outside temperature is below a preselected temperature range, and to operate the heat pump when the outside temperature is above the preselected temperature range. Within the preselected temperature range, the fossil fuel furnace may be operated during certain time periods and the heat pump may be operated during other time periods.

6 Claims, 3 Drawing Sheets

CONTROL FOR DUAL HEATING SYSTEM INCLUDING A HEAT PUMP AND FURNACE

This invention relates generally to heating and cooling, and refers more particularly to a control for the selective operation either of a fossil fuel furnace or a heat pump.

BACKGROUND AND SUMMARY OF THE INVENTION

Heat pumps are used for both heating and cooling. One of the purposes of this invention is to provide, in a dual system having both a heat pump and a fossil fuel furnace, greater comfort when the heat pump is used for heating. It does so by allowing the user to program various times of the day and night when the heat pump will be utilized for space heating and other times when the back-up fossil fuel furnace will carry the heating load. The modes of operation during these programmed times are also dependent on the temperature of the outside ambient air.

Conventional fossil fuel furnaces (powered by gas or oil) deliver air from the room registers at a temperature in the range of 100° to 140° F. Heat pumps, on the other hand, produce heated air at 85° to 95° F. Since the human body has a natural temperature of about 98.6° F., air below that temperature feels cool and chilly. This fact is compounded by the need to circulate a greater quantity of air to harvest the lower level of heat generated by the heat pump. When air is cooler to begin with, the increased air flow makes it feel drafty and even more unpleasant.

To overcome this problem, the heat pump should be used only at times when the residents are least likely to object to "cool" heat. These periods may occur (1) when no one is home, (2) when everyone is asleep, or (3) when outdoor temperatures are mild. This is accomplished preferably by means of a programmable device that modifies thermostat function. The device of this invention accomplishes these goals without causing disruption to normal thermostat operation. Should there be a need, the device can also be manually defeated at will by the user.

The control of this invention may be programmed to perform in the following manner:

Two temperature limits are identified. The lower one is that below which the heat pump is not able to sustain the heating demand of the building at the designated outdoor temperature. This designated outdoor temperature may be called the "Balance Point Temperature". The other temperature limit is higher and is chosen such that the heat pump supplies heated air considered acceptable to the occupants when the outdoor air temperature is at this designated value or higher. This designated outdoor air temperature may be called the "Comfort Temperature". Examples of these temperature limits are 32° F. and 45° F., respectively. The selection is dependent on the heat pump and fossil fuel furnace used, the building heat loss and individual personal preferences.

According to the theory of operation, the fossil fuel furnace is automatically selected by the control unit to supply all of the building heat when the outdoor temperature is below the Balance Point Temperature. Above the outdoor Comfort Temperature, all heating is generated by the heat pump. In the temperature range between the two limits, sometimes called the economy range, the control unit selects one heating unit or the other depending on the times of the day selected by the user. During early morning rising times when many people feel chilled, the user will probably program the unit to heat with the fossil fuel furnace so that the air feels warm and comfortable. During other daytime hours when there is more physical activity or when the residents are away at work or school, the heat pump can deliver its "cooler" warm air. During the evening hours, when activity levels may be reduced, the fossil fuel furnace might be selected again. To complete the daily cycle, the heat pump would likely be chosen for heating during the night time sleep period.

It is a primary object of this invention to provide a control for the operation of separate heating units such as a conventional fossil fuel furnace and a heat pump having the foregoing features.

A further object is to provide a control for the selective operation of either a fossil fuel furnace or a heat pump which is simple and easy to operate, composed of a relatively few simple parts, and capable of being readily and inexpensively manufactured.

Other objects, features and advantages of the invention will become more apparent as the following description proceeds, especially when considered with the accompanying drawings.

DETAILED DESCRIPTION

Figure 2:
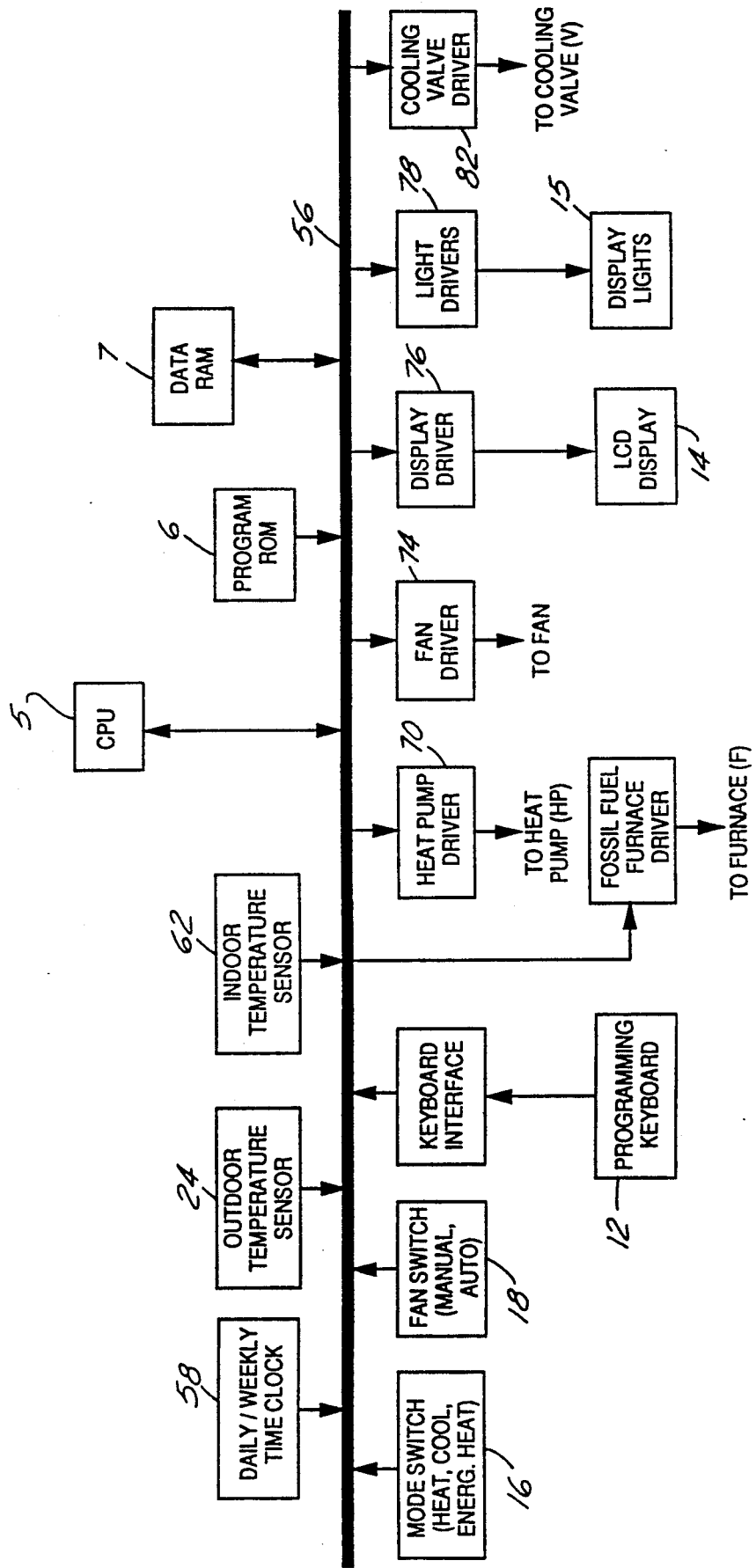
FIG. 2 is a diagrammatic view showing the hardware used in a preferred embodiment of the invention.

Referring to FIG. 2, the control of this invention comprises a central processing unit (CPU) 5 which is a computer that reads and executes the instructions of a program stored in memory storage media consisting of the Read Only Memory (PROGRAM ROM) 6 and the Random Access Memory (DATA RAM) 7 to operate either the fossil fuel furnace F or the heat pump HP in accordance with program instructions. The fossil fuel furnace F may operate on gas or oil, for example, or any other fuel such as coal.

Figure 1:
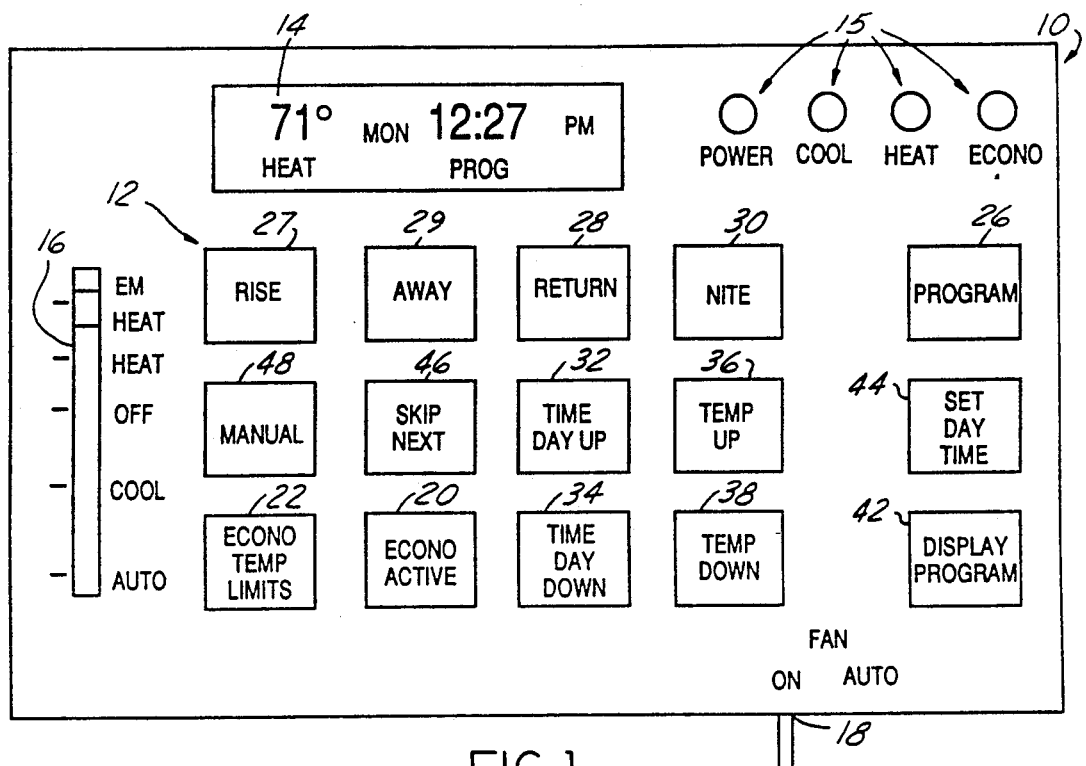
FIG. 1 is a semi-diagrammatic view showing the front face of a programmable thermostat constructed in accordance with the invention.

Referring to FIG. 1, the front face of the thermostat 10 includes a programming keyboard 12 consisting of a group of fifteen buttons shown as labeled boxes enabling the user to enter into the memory storage media the operating parameters of a thermostat program. A status liquid crystal display (LCD) 14 on which the program may be displayed is shown in the upper left of FIG. 1, and status lights 15 in the upper right. A mechanical, multi-position mode switch 16 at the left contains the operating choices of "Emergency Heat", "Heat", "Off", "Cool" and "Automatic". At the lower right is a mechanical switch 18 that can be operated to turn the fan "On" continuously or place it in "Auto" mode whereby the fan operates only when the heat pump or the fossil fuel furnace requires it to circulate air.

Referring further to FIG. 1, the ECONO ACTIVE button 20 is pressed when the user desires the heat pump and fossil fuel furnace to operate selectively in accordance with the particular instructions for which the thermostat has been programmed. The ECONO TEMP LIMITS button 22 is utilized to program the desired temperature limits, that is, the "Balance Point Temperature" which is the outdoor temperature below which the fossil fuel furnace is always selected for operation and the higher "Comfort Temperature" which is the outdoor temperature above which the heat pump is always selected for operation. Between these two outdoor temperatures is the range, sometimes called the economy range, in which either the fossil fuel furnace or the heat pump may operate depending upon program instructions. For example, the selected "Balance Point Temperature" and "Comfort Temperature" may be 32° F. and 45° F., respectively, as recorded by the outside temperature sensor 24. To enter the desired temperature limits into the program, a PROGRAM button 26 is provided.

The RISE and RETURN buttons 27 and 28 may be used to program times in the economy range when fossil fuel furnace operation is desired, whereas the AWAY and NITE buttons 29 and 30 may be used to program times in the economy range when heat pump operation is desired. The buttons 32-38 may be used to advance or set back the times of program operation as well as to increase or decrease the programmed inside temperatures desired to be maintained. The entire program may be entered in the memory storage media by the PROGRAM button 26 in combination with the situation, time and temperature buttons 20 to 22 and 27 to 38 and displayed in the LCD display 14 by the DISPLAY BUTTON 42 and SET DAY TIME button 44. The SKIP NEXT button 46 allows the program to be skipped for the next programmed period: i.e. the current programmed settings are carried through the next programmed period, after which the program resumes normal operation. The MANUAL button 48 may be used to by-pass the program altogether and in effect convert the thermostat to a common or ordinary thermostat which simply maintains the inside temperature at the desired setting at all times and without regard to outside temperature, in a conventional manner, using the fossil fuel furnace or the heat pump.

The details of the keyboard thus described are illustrative of a suitable arrangement for entering a program, but others obviously may be designed.

FIG. 2 is a block diagram of the various internal components that make up the electrical and electronic parts of the system. The central processing unit (CPU) 5 is a microprocessor that reads and executes instructions. These instructions, constituting a program, are stored in memory storage media consisting of the PROGRAM ROM 6 and DATA RAM 7 and are read by the computer via the data bus 56. The data bus 56 is shown as a path connecting the various elements of hardware depicted in FIG. 2.

A time clock 58, the outdoor temperature sensor 24 and an indoor temperature sensor 62 are included among the components of the system which feed information to the memory storage media via the data bus. Drivers for the heat pump HP, fossil fuel furnace F, fan, LCD display 14 and display lights 15 are also shown at 70-78. The heat pump is normally in the heating mode but can be switched to the cooling mode by a valve V operated by driver 82 provided for that purpose.

In a typical program, and assuming a Balance Point Temperature of 32° F. and a Comfort Temperature of 45° F., the system might, for example, be programmed for heating in the range between these two outdoor temperatures (economy range) with fossil fuel heat during the early morning rising hours from 7 A.M. to 8 A.M. and also during the evening hours from 6 P.M. to 10 P.M., relying upon heat pump operation during all other times of the day and night. This is just an example, as other program instructions may be entered into the memory storage media by use of the keyboard, as will be apparent. Also, as previously stated, the system will be programmed for heat to be supplied by the fossil fuel furnace when the outdoor temperature is below the Balance Point Temperature, and for heat to be supplied by the heat pump when the outdoor temperature is above the Comfort Temperature. The program is entered in the DATA RAM 7 by use of the keyboard. The PROGRAM ROM 6 usually contains only the basic program information supplied by the manufacturer of the software.

Figure 3:
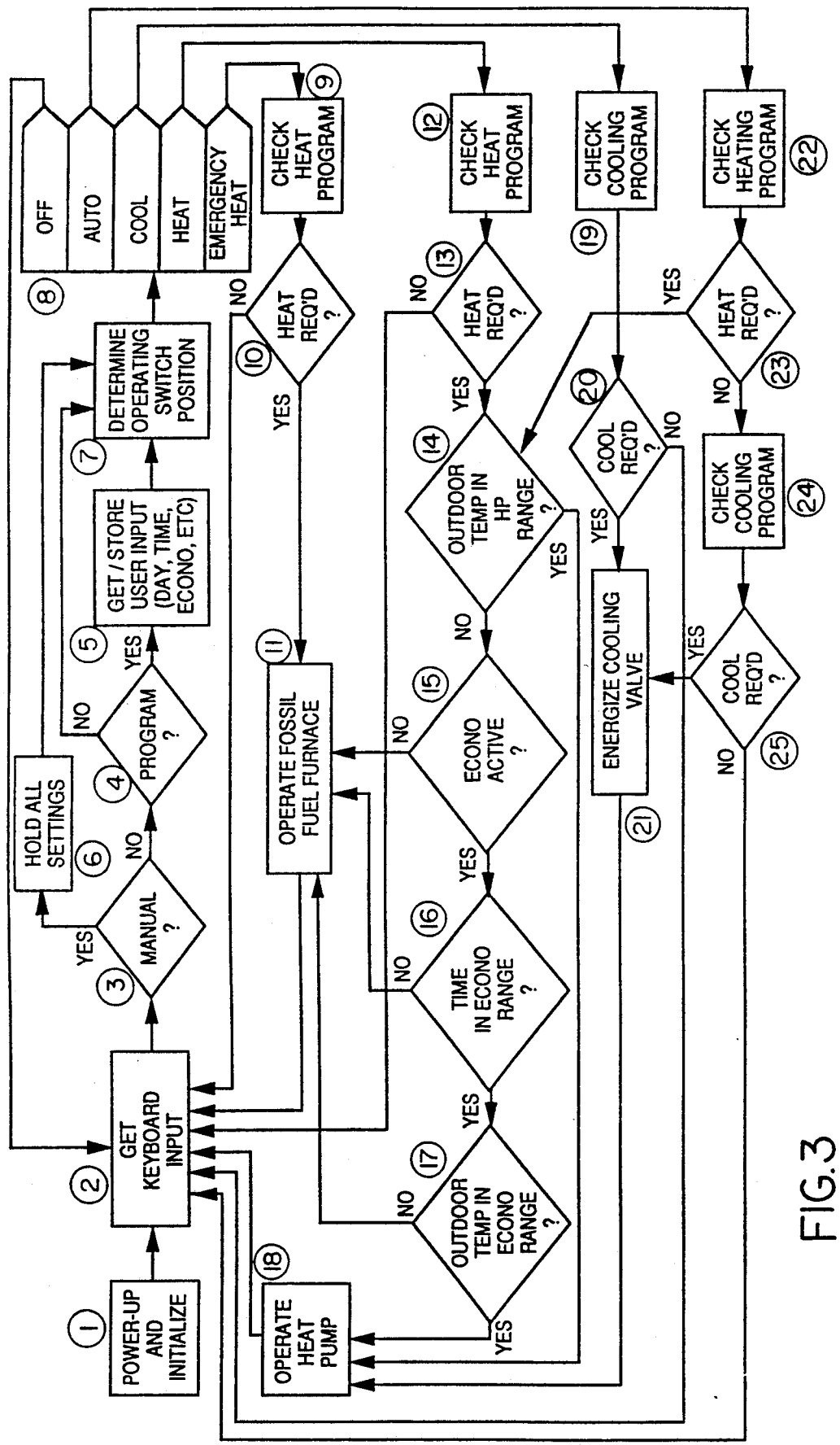
FIG. 3 is a flow chart diagram of the software.

FIG. 3 shows an example flow diagram of software operation. The various steps are described as follows:

POWER-UP AND INITIALIZE (Step #1) ===> When power is first applied to the thermostat, the software goes through an initializing routine that performs a system check, then sets all operating parameters to their default values.

GET KEYBOARD INPUT (Step #2) ===> The front panel keyboard (user-information buttons) are electronically scanned to determine if the user is entering any data. Any data present is stored in RAM 7 for use by steps #3 through #6.

MANUAL (Step #3) ===> This step is a decision making process that examines the keyboard data to determine if the user has requested the "manual" command. If so, then operation is passed along to Step #6 (HOLD ALL SETTINGS) which holds the thermostat in its present mode of operation and maintains all set points and operating modes at their current values until the unit is placed back in PROGRAM mode. If the MANUAL mode has not been selected, the program progresses on to Step #4.

PROGRAM (Step #4) ===> If the user has selected the "PROGRAM" mode, the thermostat reverts to normal operation and awaits input data choices from the user (Step #5). If "PROGRAM" mode has not been selected, the software sends operation on to Step #7 (DETERMINE OPERATING SWITCH POSITION).

GET/STORE USER INPUT (DAY, TIME, ECONO, ETC.) (Step #5) ===> If the user has requested the "PROGRAM" mode, the software interrogates the keyboard 12 or the DATA RAM 7 for input data. Such data relates to changes in operating parameters; such as the day of the week, time of day, temperature settings, the various modes ("RISE", "AWAY", "RETURN", "NITE"), economy temperature limits, that is, the Balance Point and Comfort Temperatures, and whether ECONO operation is desired. This data is then stored in the DATA RAM 7 until it is changed by the next user input from the keyboard 12.

HOLD ALL SETTINGS (Step #6) ===> This step maintains the current status of all operating set points and modes in the system until manual operation is removed by the user entering the "PROGRAM" command (Step #4).

DETERMINE OPERATING SWITCH POSITION (Step #7) ----> When this step is reached, the software samples the multi-position operating switch 16 to determine the user-requested operating mode for the thermostat.

OFF - AUTO - COOL - HEAT - EMERGENCY HEAT (Step #8) ===> In this step, five operating choices are available. Depending on the position of the multi-position switch 16, software flow will be directed to the appropriate branch.

CHECK HEAT PROGRAM (Step #9) ===> If emergency heat was identified in step #8, the heat program, which was user-established in steps #3 through #8, is examined and compared with currently measured conditions (inside temperature, time, etc.).

HEAT REQ'D (Step #10) ===> If the comparison of data in Step #9 shows that heat is required, Step #10 directs operation to Step #11 where the fossil fuel furnace F will be activated. If no heat is currently required to satisfy the demands of the building, heating operation is completed for this pass through the software and operation is returned to Step #2 where the controller routine begins anew.

OPERATE FOSSIL FUEL FURNACE (Step #11) ===> If Steps #10 or #15 through #17 have determined that fossil fuel heating is required, Step #11 activates the output circuit driver that energize the fossil fuel furnace. The furnace will remain active until none of the other steps determine a further need for fossil fuel heating.

CHECK HEAT PROGRAM (Step #12) ===> This step functions the same as Step #9 in response to the ordinary heating mode.

HEAT REQ'D (Step #13) ===> If the comparison of data in Step #12 shows that heat is required, Step #13 directs operation to Step #14 where further decisions will be made before activating the appropriate heat source. If no heat is currently required to satisfy the demands of the building, heating operation is completed for this pass through the software and operation is returned to Step #2 where the controller routine begins anew.

OUTDOOR TEMP IN HEAT PUMP RANGE? (Step #14) ===> The outdoor temperature sensor 24 is sampled. If outdoor temperature is within the normal operating range for the heat pump, that is above the Comfort Temperature, the software flow passes on to Step #18 which will activate the heat pump driver 70. If the outdoor temperature is below the normal heat pump operating range, software operation is moved to Step #15 where further decisions will be made.

ECONO ACTIVE (Step #15) ===> The economy function is interrogated to determine if the user has requested economy operation to take place at user-programmed times. If not, then operation is passed on to Step #11 which activates the fossil fuel furnace. If economy operation has been requested, software flow will move on to Step #16 where the economy time cycle is compared.

TIME IN ECONO RANGE (Step #16) ===> If the current time is within the range for economy operation and it has been previously determined that heat is required (Steps #12 through #15), operation is passed on to Step #17 where outdoor temperature comparisons are made. If the current outdoor temperature is outside the economy range, software flow is moved to Step #11 which activates the fossil fuel furnace.

OUTDOOR TEMP IN ECONO RANGE (Step #17) ===> The economy range for heat pump operation is between the Balance Point Temperature and the Comfort Temperature. In this step, the software determines whether the outside temperature is within the economy range. This can be found by actually measuring the outdoor temperature with the sensor 24 or by performing calculations of the rate of decay of indoor temperature and comparing it to the rate of heat replenishment from the heat pump. Previous history of operation is required for the latter. This could be obtained by the software as an on-gong background task.

OPERATE HEAT PUMP (Step #18) ===> The heat pump is activated when heating demand is directed from Steps #14 or #17 or cooling demand is received from Step 21.

CHECK COOLING PROGRAM (Step #19) ===> The cooling program, which was user-established in steps #3 through #8, is examined and compared with currently measured conditions (building temperature, time, etc.).

COOL REQ'D (Step #20) ===> If the comparison of data in Step #19 shows that cooling is required, Step #20 directs operation to Step #21 where the cooling process is begun. If no cooling is currently required to satisfy the demands of the building, cooling operation is completed for this pass through the software and operation is returned to Step #2 where the controller routine begins anew.

ENERGIZE COOLING VALVE (Step #21) ===> The first step in beginning the cooling process is to switch the changeover valve V in the heat pump to cooling mode. This step activates the driver 82 which energizes the valve. Operation then flows to Step #18 where the heat pump is activated.

CHECK HEAT PROGRAM (Step #22) ===> This step functions the same as Step #9 in response to the auto mode for heating.

HEAT REQ'D (Step #23) ===> If the comparison of data in Step #22 shows that heat is required, Step #23 directs operation to the normal heating portion of the software beginning at Step #14. If no heat is currently required to satisfy the demands of the building, the software moves on to check the cooling program at Step #24 for further action.

CHECK COOLING PROGRAM (Step #24) ===> This step functions the same as Step #19.

COOL REQ'D (Step #25) ===> If the comparison of data in Step #24 shows that cooling is required, Step #25 directs operation to the normal cooling portion of the software beginning at Step #21. If no cooling is currently required to satisfy the demands of the building, cooling operation is completed for this pass through the software and operation is returned to Step #2 where the controller routine begins anew.

Figure 4:
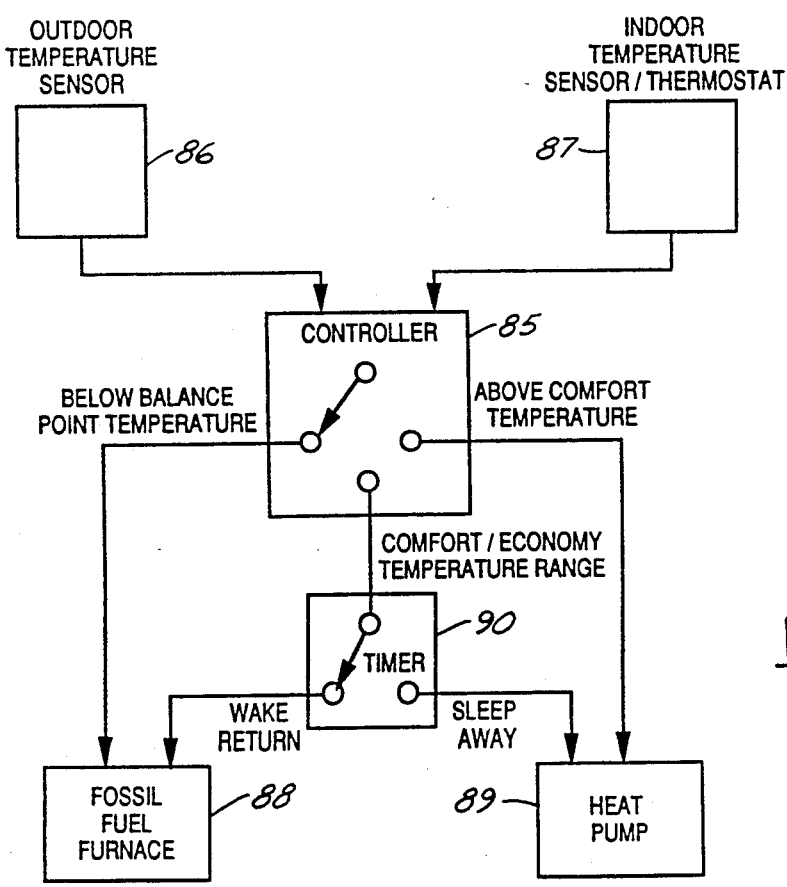
FIG. 4 is a diagram of a simplified mechanical version of the control.

FIG. 4 is a diagram of a simplified mechanical version of the control logic. The controller 85 is a switch that receives outdoor temperature information from the outside sensor 86 and receives a call for heat from the indoor temperature sensor/thermostat 87 depending upon the indoor temperature and thermostat setting. The controller is shown set to command operation of the fossil fuel furnace 88 when the outdoor temperature sensor indicates an outdoor temperature below the Balance Point Temperature. When the outdoor temperature sensor 86 indicates an outdoor temperature above the Comfort Temperature, the controller is switched to command operation of the heat pump 89. When the outdoor temperature sensor indicates an outdoor temperature between the Balance Point and Comfort Temperatures, that is, a temperature in the economy range, the controller is switched to the timer 90 which commands operation of the fossil fuel furnace 88 or the heat pump 89 depending upon the operation program. The timer 90 may, for example, be set to switch to fossil fuel furnace operation during the day and heat pump operation at night.

While the furnace F has been described as, and usually is operated by fossil fuel, it may be operated by any available heat source.

What is claimed is:

1. Apparatus for the selective operation of first and second heating units for heating a room or rooms of a building, comprising control means operative when actuated to operate one or the other of said heating units, an inside temperature sensor for sensing the temperature in the room or rooms to be heated and operable to actuate said control means to call for heat, an outside temperature sensor for sensing the temperature outside the building and a mechanism for selecting one or the other of said heating units for operation by said control means, said mechanism having means for selecting only said first heating unit for operation by said control means in response to the sensing by said outside temperature sensor of an outside temperature below a predetermined temperature range and to select only said second heating unit for operation by said control means in response to the sensing by said outside temperature sensor of an outside temperature above said predetermined temperature range, said mechanism having means operative in response to the sensing by said outside temperature sensor of an outside temperature within said predetermined temperature range, to select only said first heating unit for operation during certain time periods and to select only said second heating unit for operation during other time periods, and a programmer having means for entering a desired entirely occupant discretionary program for the operation of said mechanism to establish the time periods during which said first and second heating units are operated and to establish the upper and lower limits of said predetermined temperature range.

2. Apparatus as defined in claim 1, wherein said first heating unit is a fossil fuel furnace and said second heating unit is a heat pump.

3. Apparatus as defined in claim 1, wherein said second heating unit is a heat pump.

4. Apparatus as defined in claim 2, and further including a display panel on which the program is displayed.

5. Apparatus as defined in claim 2, and further including means for by-passing said program to enable the selective operation of said first and second heating units by an operator.

6. Apparatus as defined in claim 2, and further including a mode switch having a heating mode position and a cooling mode position, said mode switch when in said heating mode position causing said apparatus to function as aforesaid, and valve means operative when said mode switch is in the cooling mode position and said inside temperature sensor demands cooling to condition said heat pump for cooling and to effect operation of said heat pump.

* * * * *